United States Patent
Fuchs et al.

(10) Patent No.: US 7,406,711 B2
(45) Date of Patent: Jul. 29, 2008

(54) METHOD AND APPARATUS FOR ENFORCING INDEPENDENCE OF PROCESSORS ON A SINGLE IC

(75) Inventors: Kenneth C. Fuchs, Winfield, IL (US); Brian W. Pruss, Streamwood, IL (US); Timothy M. Langham, Streamwood, IL (US)

(73) Assignee: Motorola, Inc., Schaumburg, IL (US)

( * ) Notice: Subject to any disclaimer, the term of this patent is extended or adjusted under 35 U.S.C. 154(b) by 246 days.

(21) Appl. No.: 11/218,361

(22) Filed: Sep. 2, 2005

(65) Prior Publication Data

US 2007/0055803 A1     Mar. 8, 2007

(51) Int. Cl.
*G06F 21/00* (2006.01)

(52) U.S. Cl. ............... 726/21; 726/9; 726/20; 726/25; 726/27; 713/172

(58) Field of Classification Search .......... 726/9, 726/20, 21, 25, 27; 713/172
See application file for complete search history.

(56) References Cited

U.S. PATENT DOCUMENTS

| | | | | |
|---|---|---|---|---|
| 5,907,689 A | * | 5/1999 | Tavallaei et al. | ............ 710/110 |
| 6,052,763 A | * | 4/2000 | Maruyama | .................. 711/152 |
| 6,141,756 A | | 10/2000 | Bright et al. | |
| 6,195,733 B1 | * | 2/2001 | Nair et al. | ................... 711/202 |
| 6,282,657 B1 | | 8/2001 | Kaplan et al. | |
| 6,292,874 B1 | | 9/2001 | Barnett | |
| 6,502,167 B1 | * | 12/2002 | Tanaka et al. | ................ 711/114 |
| 6,851,056 B2 | * | 2/2005 | Evans et al. | .................. 713/193 |
| 2004/0177269 A1 | | 9/2004 | Belnet et al. | |
| 2004/0181682 A1 | | 9/2004 | Orino et al. | |
| 2004/0260910 A1 | | 12/2004 | Watt et al. | |
| 2005/0114616 A1 | | 5/2005 | Tune et al. | |
| 2005/0160210 A1 | | 7/2005 | Watt et al. | |
| 2006/0002309 A1 | * | 1/2006 | Ban | ........................... 370/254 |
| 2006/0080485 A1 | * | 4/2006 | Tawara et al. | ................ 710/110 |

FOREIGN PATENT DOCUMENTS

| JP | 2001-005726 | * | 1/2001 |
|---|---|---|---|
| JP | 2001-297054 | * | 10/2007 |

\* cited by examiner

*Primary Examiner*—Kambiz Zand
*Assistant Examiner*—Tongoc Tran
(74) *Attorney, Agent, or Firm*—Indira Saladi; Valerie M. Davis

(57) ABSTRACT

A single-chip integrated circuit comprising a first processor for executing a plurality of applications, a second processor for executing a plurality of applications, at least one of a) at least one embedded peripheral and b) at least one memory, and a bus monitor for allowing access to the at least one of a) the at least one embedded peripheral and b) the at least one memory, if the access is allowed, wherein the bus monitor comprises a mapping of access rights to the at least one of a) the at least one embedded peripheral and b) the at least one memory for the first processor and the second processor is disclosed.

20 Claims, 4 Drawing Sheets

|  | PROCESSOR A (MAIN PROCESSOR) PERMISSIONS | PROCESSOR B (MONITOR) PERMISSIONS |
|---|---|---|
| ADDRESS REGION #1 0x0000 - 0x0FFF SRAM | READ AND WRITE | READ - ONLY |
| ADDRESS REGION #2 0x1000 - 0x2FFF USART PERIPHERAL A | READ AND WRITE | NONE |
| ADDRESS REGION #3 0x8000 - 0xFFFF USART PERIPHERAL B | NONE | READ AND WRITE |

*FIG. 3*

METHOD AND APPARATUS FOR ENFORCING INDEPENDENCE OF PROCESSORS ON A SINGLE IC

FIELD OF THE INVENTION

The present invention relates generally to embedded systems and more specifically to the field of enforcing independence of processors on a single Integrated Circuit (IC).

BACKGROUND OF THE INVENTION

In the field of embedded systems, systems are sometimes required to exhibit a high level of reliability and fault tolerance. A high level of reliability and fault tolerance is typically achieved through the use of redundant processing techniques. For example, a redundant processor may provide continuous verification of a main processor and may be included to achieve a high level of reliability and fault tolerance of the system. In such a case, it is important that the redundant processor be truly independent and unable to affect the output of the main processor, or else the redundant processor will need verification itself. In many cases, the redundant processor is a device that is specifically designed to perform error detection.

Having two processors is effective, but has the disadvantage of requiring additional physical components. Having additional physical components often increases the cost and design difficulty. Further, having two processors may not be easily adaptable to new applications, since the redundant processor may need to be redesigned each time new functionality is added.

Despite these disadvantages, many solutions utilize two general purpose microprocessors and many solutions place two microprocessor cores on a single Integrated Circuit (IC). One typical design is a single IC with two microprocessor cores where each processor has its own system bus, memories and embedded peripherals. A second typical design is a single IC with two microprocessor cores, a shared system bus, memories and peripherals, where both microprocessor cores are allowed access to the memories and peripherals. Both of these typical designs have drawbacks, such as those mentioned above. In any case, existing typical designs are not suitable for systems that require a high level of reliability and fault tolerance.

Thus, there is a need for a single IC capable of adapting to a wide range of uses without complete duplication of all system memories and peripherals while still having the ability to partition the system to create a main processing device and independent verifier.

BRIEF DESCRIPTION OF THE FIGURES

The present invention is illustrated by way of example and not limitation in the accompanying figures, in which like references indicate similar elements, and in which:

FIG. 3 is a table illustrating an example bus monitor configuration in accordance with an embodiment of the present invention.

Figure 1:
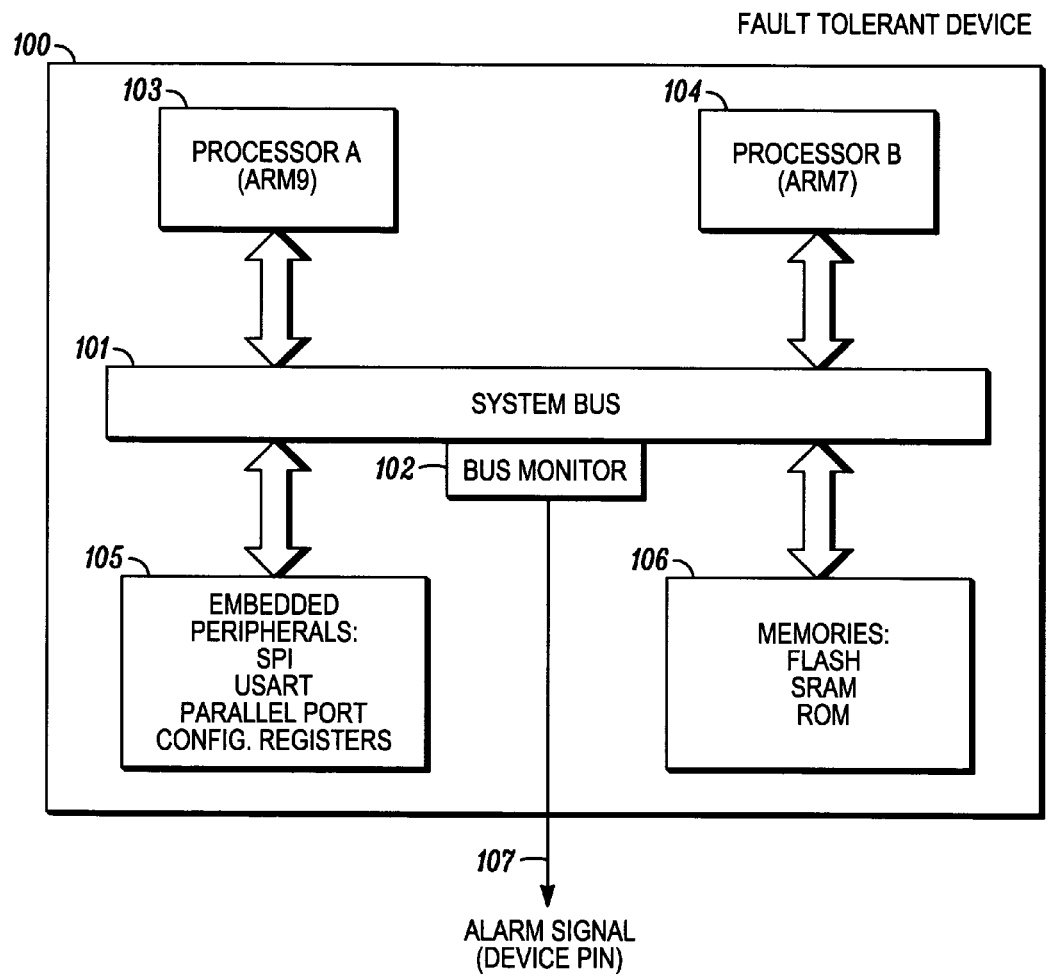
FIG. 1 is a block diagram illustrating a high assurance IC in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments of the present invention, it should be observed that the present invention resides primarily in combinations of method steps and apparatus components. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

FIG. 1 is a block diagram graphically illustrating the internal components of a single-chip integrated circuit (IC) 100 in accordance with one embodiment of the present invention. The single-chip IC 100 comprises a system-wide bus 101 equipped with a bus monitor 102 connected to an external alarm signal 107. The single-chip IC also includes two processors where processor A 103 is the main processor and processor B 104 acts as a monitor responsible for verifying the correct behavior of processor A and detecting any faults in the single-chip IC 100. Both processors 103, 104 are connected to the system wide bus 101 so that the processors 103, 104 can access embedded peripherals 105 and memories 106.

In one embodiment, each processor 103, 104 is capable of executing a plurality of applications independently of the other processor. In one embodiment, processor A 103 is an ARM9 processor available from ARM, LTD. Further, processor B 104 is an ARM7 processor available from ARM, LTD.

Even though this description illustrates a single-chip IC 100 with two processors, the single-chip IC can comprise any number of processors. As such, the number two is not meant to be a limitation on any embodiment of the present invention. Further, as is known to one of ordinary skill in the art, having a single-chip IC with any number of processors is considered to be equivalent to the embodiment illustrated in FIG. 1.

In one embodiment, example embedded peripherals 105 include a SPI, an USART, a parallel port, and configurable registers. As is known to one of ordinary skill in the art, other such embedded peripherals may be included on the single-chip IC 100. For example, a timer, LFSR, etc. may be included on the single-chip IC 100.

In one embodiment, example memories 106 include FLASH, SRAM, and ROM. As is known to one of ordinary skill in the art, other such memories may be included on the single-chip IC 100. For example, ROM, RAM, and other memories may be included on the single-chip IC 100.

The bus monitor 102 functions to enforce the independence of the two processors 103, 104 and the embedded peripherals 105 and memories 106 that the processors 103, 104 access. As used herein, enforcing the independence of the two processors 103, 104 means to enforce each processor's access rights to the embedded peripherals 105 and the memories 106. In one embodiment, enforcing independence of the two processors is accomplished by maintaining a table of address ranges that define access rights to the embedded peripherals 105 and the memories 106. In such an embodiment, the table maps access rights to the embedded peripherals 105 and the memories 106.

In any case, enforcing independence of the two processors means that the bus monitor validates bus accesses against its configuration. In one embodiment, if any disallowed accesses are attempted, the bus access is blocked and an alarm signal is activated, e.g. via alarm signal 107. In one embodiment, the activation of the alarm signal consists of an automatic write to a register internal to the device that causes an external electrical signal to be raised. Raising an external electrical signal may allow external devices to take actions necessary to contain the detected failure.

In one embodiment, the bus monitor comprises mutually exclusive permissions so that only one processor has write access to the embedded peripherals and the memories. For example, processor A 103 may have read and write access to embedded peripherals 105 and memories 106, while processor B 104 may only have read access to embedded peripherals and memories. By allowing only one device to have write access to the embedded peripherals and the memories, independent subsystems are created in the single-chip IC 100.

Figure 2:
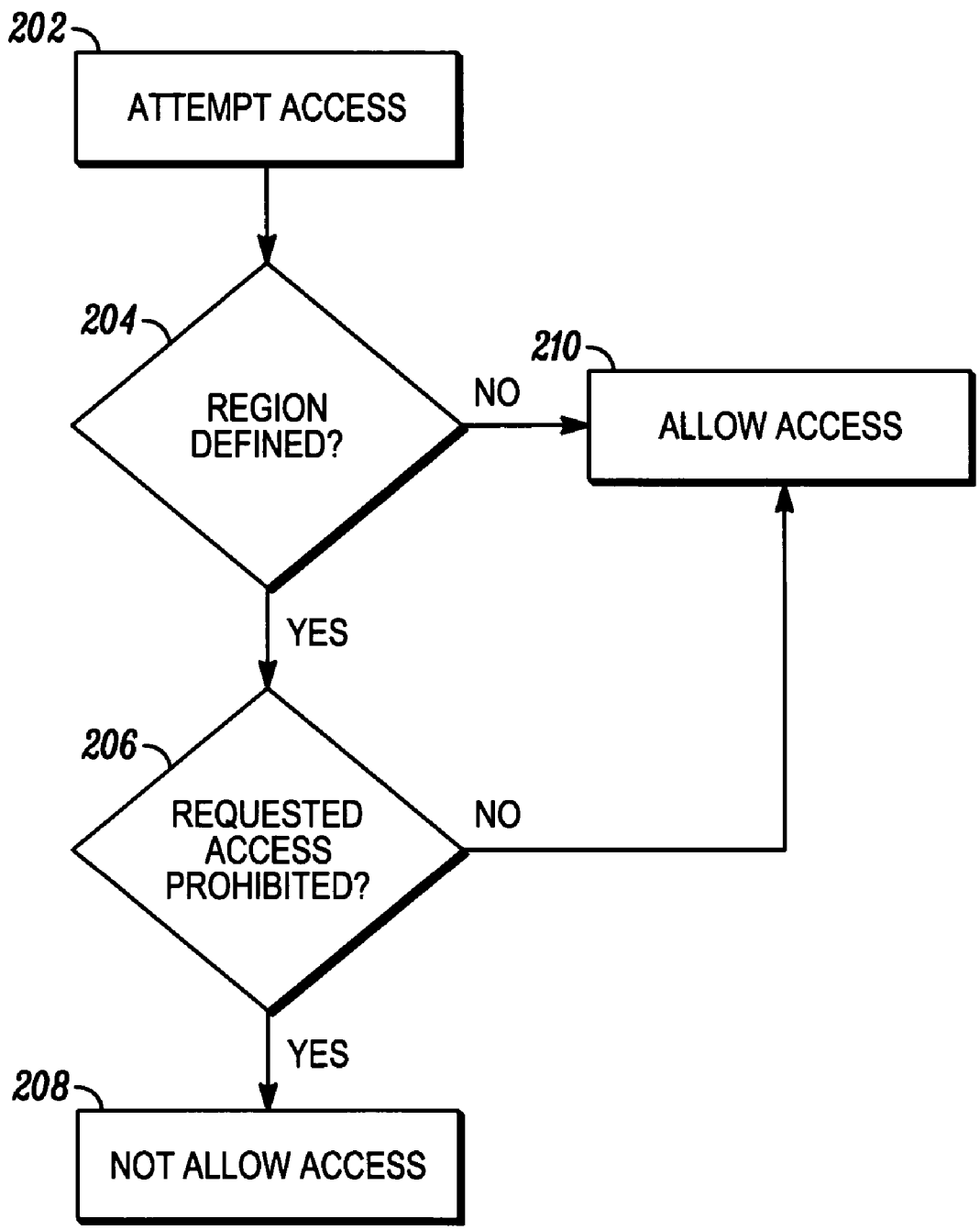
FIG. 2 is a flow diagram illustrating a method for enforcing independence between processors in accordance with an embodiment of the present invention.

FIG. 2 illustrates a method for enforcing independence between processors in accordance with an embodiment of the present invention. At step 202, a processor, e.g. processor A 103, requests access to an embedded peripheral or memory. Since the bus monitor 102 monitors the system-wide bus 101, the request is received by the bus monitor 102. Further, the request identifies an address that is associated with the embedded peripheral or the memory. For example, an embedded peripheral, such as a parallel port, may be accessed by address 0×0010. If a processor, e.g. processor A 103, wants access to the parallel port, the request will contain the address 0×0010. At step 204, the bus monitor receives the request and compares the address contained in the request with its configuration to determine whether the processor should be allowed access to the address. In one embodiment, the configuration that the bus monitor utilizes for enforcing independence between the processors is a table that maps an embedded peripheral 105 or memories 106 to access rights for a given processor.

At Step 204, the bus monitor determines whether the address in the request is in a defined region in its configuration. If the address does not fall within one of the address ranges configured in the bus monitor (Step 204), the access is permitted (Step 210). If the address does fall within one of the configured address ranges (Step 204), the permissions associated with the address range are examined (Step 206). In one embodiment, the permissions are specific to a given processor. For example, processor A 103 may be able to write to address region #1, but processor B 104 may only be able to read to address region #1. If the requested access is not prohibited for the processor requesting the access (Step 206), then the access is allowed (Step 210). If the requested access is prohibited for the processor requesting access (Step 206), then the access is not allowed (Step 208). In one embodiment, if an access is not allowed, then an alarm signal, e.g. alarm signal 107) is activated.

FIG. 3 illustrates an example bus monitor configuration. In this example, each processor is given specific access rights based upon the address region. For each address region, each processor may be given read, write and/or execute access independently of the other processor. For example, in FIG. 3, processor A 103 is given read and write access to address region #1 302, e.g. a block of SRAM memory. However, processor B 104 only has read access to address region #1 302. By allowing processor B 104 to read address region #1, processor B 104 is able to monitor and verify data being processed by processor A 103, without altering the operation of processor A 103. In such a manner, processor B 104 is able to verify the correct behavior of processor A 103 without affecting the operation of processor A 103.

Figure 4:
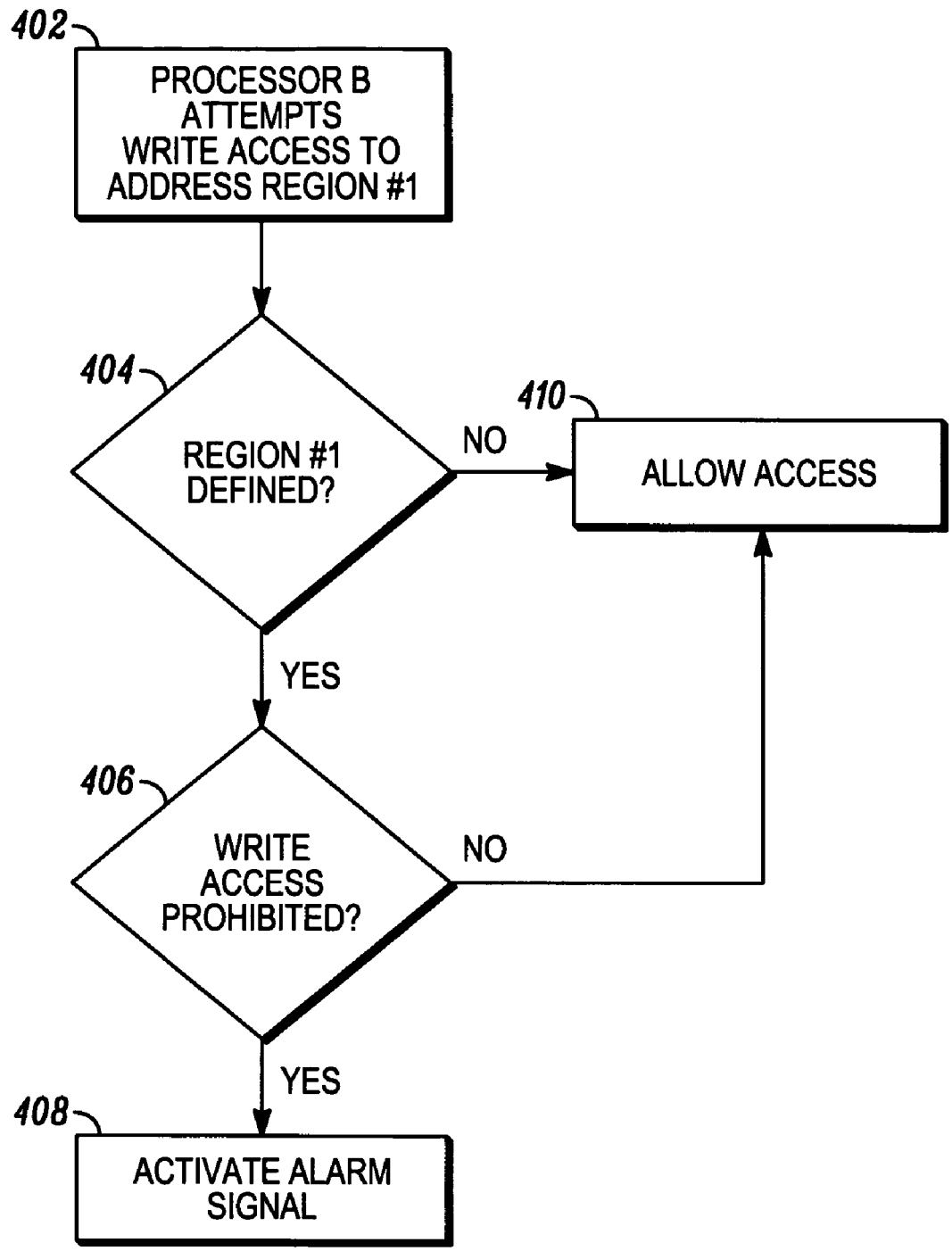
FIG. 4 is a flow diagram illustrating an example method for enforcing independence for the example bus monitor configuration of FIG. 3.

Furthermore, the example configuration shows address ranges for address regions #2 304 and #3 306 which allow for both read and write access to an USART. If address region #2 maps to a first USART and address region #3 maps to a second USART, then processor A is able to utilize the first USART while processor B is not able to utilize the first USART since it is assigned to processor A. In the example configuration of FIG. 3, the bus monitor is configured so that each processor is only permitted to use the USART assigned to it. In an embodiment, the receive line of the USART assigned to processor B 104 is externally connected to the transmit line of processor A 103's USART and the transmit functionality of the USART assigned to processor B 104 is physically disconnected so that it is not usable. By allowing processor B 104 access to processor A's USART, processor B 104 can verify the data being sent out of the single-chip IC 100. p FIG. 4 shows an example where a request by processor B 104 activates an alarm signal based upon the example configuration of FIG. 3. At step 402, processor B 104, attempts write access to address region #1 302. The bus monitor 102 processes the request for a write access and identifies address region #1 302 for the request. At step 404, the bus monitor receives the request and compares the address contained in the request with its configuration to determine whether processor B 104 should be allowed access to the address region #1 302. Since the address falls in one of the configured address ranges (Step 404), namely address region #1 302, the permissions associated with address range #1 302 are examined (Step 406). Since the requested access is prohibited for processor B 104, then the access is not allowed and an alarm signal is activated (Step 408).

In a further embodiment, a single-chip IC 100 may be configured to allow protection of sensitive data against misuse by untrusted software running on one of the processors. For example, the bus monitor may be configured to disallow the processor running the untrusted software access to the sensitive data and hence preventing unauthorized access to the sensitive data.

It will be appreciated that embodiments of the present invention described herein may be comprised of one or more conventional processors and unique stored program instructions that control the one or more processors to implement, in conjunction with certain non-processor circuits, some, most, or all of the functions described herein. The non-processor circuits may include, but are not limited to, a radio receiver, a radio transmitter, signal drivers, clock circuits, power source circuits, and user input devices. As such, these functions may be interpreted as steps of a method. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A single-chip integrated circuit, comprising:
a first processor for executing a plurality of applications;
a second processor for executing a plurality of applications;
at least one of a) at least one embedded peripheral and b) at least one memory; and
a bus monitor for monitoring a system bus for access requests for the first and second processors comprising the single-chip integrated circuit and sharing the system bus, wherein each access request comprises an address, the bus monitor further for examining permissions associated with the address when the address falls within an address range for the corresponding access request, and allowing access to the at least one of a) the at least one embedded peripheral and b) the at least one memory if permissions allow access,
wherein the bus monitor comprises a mapping of access rights to the at least one of a) the at least one embedded peripheral and b) the at least one memory for the first processor and the second processor.

2. The single-chip integrated circuit of claim 1, further comprising a system bus connecting the first processor, the second processor, the at least one embedded peripheral, the at least one memory, and the bus monitor.

3. The single-chip integrated circuit of claim 1, further comprising an alarm signal coupled to the bus monitor.

4. The single-chip integrated circuit of claim 3, wherein the alarm signal is activated when an access is not allowed.

5. The single-chip integrated circuit of claim 1, wherein the at least one embedded peripheral is one taken from the group a SPI, an USART, a parallel port, and configuration registers.

6. The single-chip integrated circuit of claim 1, wherein the at least one memory is one taken from the group FLASH, SRAM, and ROM.

7. The single-chip integrated circuit of claim 1, wherein the first processor is an ARM9 processor.

8. The single-chip integrated circuit of claim 1, wherein the second processor is an ARM7 processor.

9. The single-chip integrated circuit of claim 1, wherein the mapping is accomplished by a table of address ranges and access rights for the first processor and the second processor.

10. A method for enforcing independence of processors in a single-chip integrated circuit, comprising the steps of:
monitoring by a bus monitor a system bus for an access request, wherein the access request comprises an address and wherein the access request is sent by a processor on the single-chip integrated circuit;
determining whether the address is within an address range for the access request by comparing the address with the address range, wherein the bus monitor comprises at least one address range;
examining permissions associated with the address, if the address falls within the address range; and
allowing access to the address, if the permissions allow access,
wherein the single-chip integrated circuit comprises at least two processors sharing access to a single system bus.

11. The method of claim 10, further comprising allowing access to the address, if the address is not within the at least one address range.

12. The method of claim 10, further comprising disallowing access to the address, if the permissions do not allow access.

13. The method of claim 12 further comprising an alarm signal if permissions do not allow access.

14. The method of claim 10 wherein the step of examining permissions further comprises identifying permissions in a configuration of the bus monitor.

15. The method of claim 10 wherein the configuration is accomplished by a table comprising address ranges and access rights for the processor.

16. The method of claim 10 wherein the processor is at least one of an ARM9 processor and an ARM7 processor.

17. A single-chip integrated circuit, comprising:
a bus monitor for allowing access to a at least one of a) a at least one embedded peripheral and b) a at least one memory, if the access is allowed for a processor,
wherein the bus monitor comprises a mapping of access rights to the at least one of a) the at least one embedded peripheral and b) the at least one memory for the processor and
wherein the bus monitor comprises:
i) means for monitoring a system bus for an access request from the processor, wherein the access request comprises an address associated with the access request, and wherein the system bus connects the processor to the at least one of a) one embedded peripheral and b) the at least one memory;
ii) means for determining whether the address is within an address range for the access request by comparing the address with the address range;
iii) means for examining permissions associated with the address, if the address falls within the address range; and
iv) means for allowing access to the address, if the permissions allow access.

18. The single-chip integrated circuit of claim 17, wherein the processor is at least one of an ARM7 processor and an ARM9 processor.

19. The single-chip integrated circuit of claim 17, wherein the mapping comprises a table of address ranges and access rights for the processor.

20. The single-chip integrated circuit of claim 17, further comprising means for disallowing access to the address, if the permissions do not allow.

* * * * *